United States Patent [19]

Hinterlechner

[11] Patent Number: 5,876,765
[45] Date of Patent: Mar. 2, 1999

[54] INJECTION MOLDING EQUIPMENT FOR ENCAPSULATING SEMICONDUCTOR DIE AND THE LIKE

[75] Inventor: Gerhard Hinterlechner, Weinheim, Germany

[73] Assignee: Micron Technology, Inc., Boise, Id.

[21] Appl. No.: 556,187

[22] Filed: Nov. 9, 1995

[51] Int. Cl.⁶ .......................... B29C 45/02; B29C 45/20; B29C 45/27; B29C 45/38
[52] U.S. Cl. .................... 425/116; 425/129.1; 425/190; 425/192 R; 425/544; 425/549; 425/552; 425/569; 425/572; 425/588; 425/DIG. 51; 264/272.17
[58] Field of Search ................................ 425/116, 129.1, 425/121, 190, 192 R, 543, 544, 549, 547, 552, 568, 570, 569, 572, 58, DIG. 51, 120; 264/272.17, 328.8, 328.9

[56] References Cited

U.S. PATENT DOCUMENTS

| 3,729,280 | 4/1973 | Hehl | 425/251 |
|---|---|---|---|
| 3,952,927 | 4/1976 | Schaumburg | 425/568 |
| 4,312,630 | 1/1982 | Travglini | 425/549 |
| 4,451,224 | 5/1984 | Harding | 425/572 |
| 4,576,567 | 3/1986 | Crellert | 425/568 |
| 4,752,199 | 6/1988 | Arai | 264/328.12 |
| 4,917,595 | 4/1990 | Nakamura et al. | 425/569 |
| 4,946,633 | 8/1990 | Saeki et al. | 425/116 |
| 5,061,164 | 10/1991 | Sabado et al. | 425/116 |
| 5,071,334 | 12/1991 | Obara | 425/116 |
| 5,232,710 | 8/1993 | Miyazawa et al. | 425/572 |
| 5,302,101 | 4/1994 | Nishimura | 264/272.12 |
| 5,358,398 | 10/1994 | Giesen | 425/116 |
| 5,429,488 | 7/1995 | Neu | 425/116 |

FOREIGN PATENT DOCUMENTS

| 13154 | 7/1980 | European Pat. Off. | 425/543 |
|---|---|---|---|
| 1385652 | 12/1964 | France | 425/543 |
| 3338783 | 3/1985 | Germany . | |
| 58-39428 | 3/1983 | Japan | 425/549 |
| 61-106217 | 5/1986 | Japan . | |
| 62-90213 | 4/1987 | Japan | 264/272.17 |

OTHER PUBLICATIONS

Plastics Technology, 27, No. 4, p. 22 (Apr. 1981)"Hollow--Spres Process Thermosetting Molding Cycles"

Prost, Plastics Technology, 27, No. 5, pp. 67–69, (May 1981)"Hyperthermal Runner System".

Primary Examiner—Khanh P. Nguyen

[57] ABSTRACT

A device for encapsulating a plurality of semiconductor die comprises a form having first and second halves such that as the first half contacts the second half the first and second halves have a plurality of cavities therein. The first and second halves each comprise a conduit therein for receiving a heated liquid. The device further comprises a runner block having a hole therein, a separate runner for each cavity, and a conduit therein for receiving a heated liquid. The runners have a rectangular cross section and a width to height ratio of at least 3:1. The device further comprises a mounting plate for mating with the runner block. The mounting plate comprises a concave recess and a hole in the mounting plate at the recess. The hole in the mounting plate passes through the mounting plate to align with the hole in the runner block such that an encapsulation material can be passed between the mounting plate and the runner block. The device further comprises a heated nozzle having a hole therethrough and a convex head wherein the concave recess is adapted to receive the convex head such that an encapsulation material can be passed between the nozzle and the mounting plate. The device further comprises a spring which urges the nozzle away from the mounting plate.

11 Claims, 6 Drawing Sheets

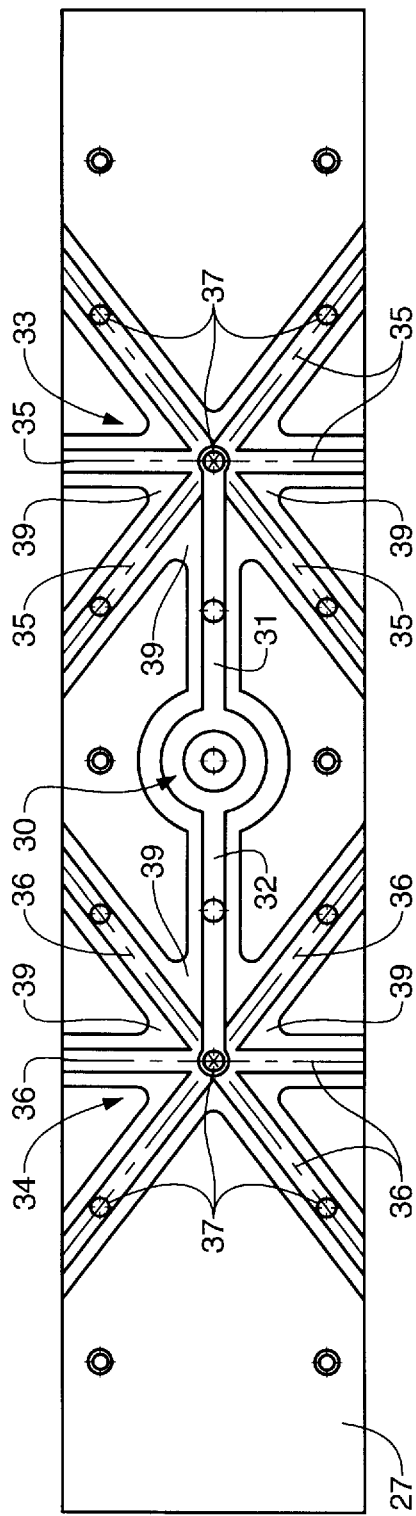
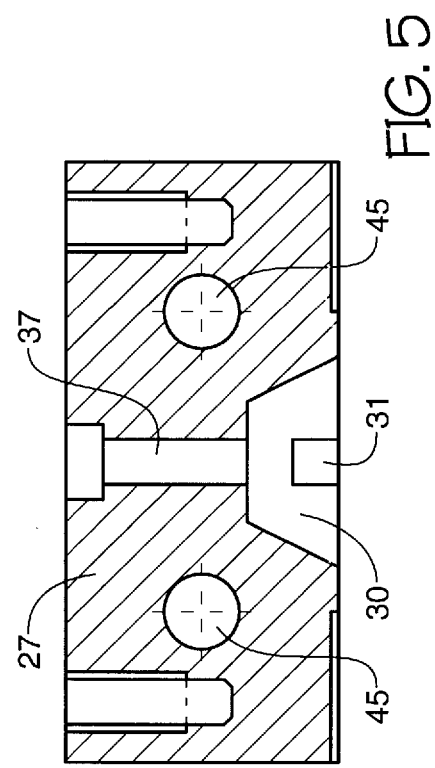

INJECTION MOLDING EQUIPMENT FOR ENCAPSULATING SEMICONDUCTOR DIE AND THE LIKE

FIELD OF THE INVENTION

The invention relates to the field of semiconductor manufacture, and more particularly to a method and apparatus for encapsulating semiconductor die in encapsulation material.

BACKGROUND OF THE INVENTION

To form an encapsulated integrated circuit (IC), a plurality of semiconductor die are conventionally arranged on a lead frame. The lead frame functions as a carrier for the plurality of die and forms the leads for each IC device. Prior to encapsulation, bond wires are attached to bond pads on the die and to the lead fingers of the lead frame. The plurality of die and the bond wires are then encapsulated to form a housing from which only the ends of the leads extend. The encapsulation protects the die and makes it possible for the ICs to be used industrially.

The die is a very sensitive component and the encapsulation must fulfill various quality requirements. For example, the encapsulation must provide the following functions:

1. Protection against physical influences (bending, shock, vibration, etc.) and support for the die.
2. Sufficient electrical insulation even after extended exposure to moisture and heat.
3. Resistance to the corrosive action of chemicals to which the package may be exposed.
4. Sufficiently high adhesion to other surfaces. High adhesion to surfaces reduces the possibility of the lead frame separating from the encapsulation which would allow moisture to enter the package along the leads.
5. High thermal conductivity so heat generated by the die will conduct to the outside of the package and dissipate.
6. Sufficient stability to avoid the production of byproducts which might damage the die encased within the encapsulation.
7. Resistance to variations in temperature, for example between −65° C. and +200° C.

To help fulfill these requirements, the production of bubbles within the encapsulation is to be avoided. One method to avoid the production of bubbles is to encapsulate the die under an appropriately high pressure. However, overly high pressures are to be avoided as a die can be damaged by excessive pressures. In particular, the bond wires, often having a diameter of less than 2.5 micrometers ($\mu$m), can drift or come loose from the bond pad or lead finger during encapsulation of the die in plastic. During drifting the conductor wires are deformed by the flowing plastic, and they can touch each other or come so close to each other that the insulation resistance between them is too small and short-circuiting can occur.

Transfer molding is often used to encapsulate semiconductor die. Using the transfer molding method, lead frames with die thereon are placed into a mold with correspondingly adapted hollow spaces. The encapsulation material, such as thermoset in the form of pellets filled with fillers such as glass fibers or mineral flakes, is placed into a piston-cylinder unit, heated, and then pressed by a piston via a system of casting conduits into the hollow spaces of the form.

Transfer molding includes manufacturing using large tools with only one transfer cylinder (multi-cavity system) and on small tools with several small transfer cylinders (multi-piston system). The manufacturing with large tools has the disadvantage that the larger they are the more difficult it becomes to achieve a uniform filling of the hollow spaces of the mold. The pressure produced by the equipment must be sufficient to fill the cavity which is the most difficult to fill. This results in a high pressure at the cavities closest to the transfer cylinder which can damage the die in those cavities. Moreover, the molds become increasingly imprecise as they become larger such that it becomes difficult to achieve the desired dimensional accuracy. Since the demand on the reliability and the dimensional accuracy becomes greater with increasing device density and increasing lead density, the trend to make the tools larger to increase efficiency stands in contrast to the increased demands for accuracy. In addition, the large tools have increased downtime because of increased loading and unloading, and the additional time required for cleaning the large-surface tools.

Encapsulating devices on small tools with several small transfer cylinders makes possible shorter cycle times, improved dimensional accuracy and, on account of the shorter injection paths, a generally improved encapsulation. However, the design of an injection unit operating with several transfer cylinders is expensive as a complete injection unit (which consists of the cylinder, the piston with hydraulic mechanism and control as well as the automatic charging of the cylinder with the molding material in pellet form) is required for each two to four cavities in the mold.

The construction of the tools, the arrangement of the numerous injection units, and the supply of material are determined by the component to be produced and by the type lead frame. The tools used are therefore determined by the length of the lead frame, number of die on each lead frame, the dimensions of the lead frame and of the final package, the weight and pellet size of the encapsulation material, as well as the injection rate and injection pressure. The complete block including the injection units must be replaced upon a change of product, which is expensive.

Even though the accuracy of small transfer molding tools produces quality components, the cost-performance ratio for small tools is unfavorable for the manufacturing production quantities of semiconductor devices.

There is a need for the ability to produce high density devices which require high accuracy due to increased lead density with less complexity and increased throughput.

SUMMARY OF THE INVENTION

In accordance with one embodiment of the invention, a semiconductor device is encapsulated using a low pressure encapsulation with a thermoset, or alternately a thermoplastic material. This is in contrast to previous methods in which the molding material is supplied in pellet form.

The inventive method and apparatus which allows for injection molding to form semiconductor packages offers various advantages, such as allowing for increased automation over transfer methods of encapsulation. Also, with injection molding the feed of encapsulation material is more controllable than with transfer molding. With transfer molding, an accurate volume of pellets must be supplied, and the supply must be changed each time a new type of device is to be encapsulated. In the case of an injection molding device, different volumes can be injected without changes in the actual device for supplying material. Further, the inventive method and apparatus provides improved thermal and structural homogeneity of the molding material over transfer molding methods. For example, a plasticizing screw (auger) intake and the melting of the encapsulation material in the injection molding cylinder under the action of the screw is advantageous for a uniform flowing of the molding material in the mold and results in more uniform packages with reduced bubbles. Also, changeover to a different package type is more easily accomplished as only a divided mold and a runner block must be replaced. This makes possible a rapid tool change which permits a more flexible and therefore more economical manufacture. Further, the use of the inventive injection molding method results in a decrease of the cycle time as the molding material is pre-softened in the screw cylinder so that time waiting for the encapsulation to soften is reduced or eliminated. Encapsulation can therefore occur more quickly as softening in the transfer cylinder is not required. Finally, the flow behavior of the molding material is more simply and precisely controlled than in the transfer method, which improves the dimensional accuracy and quality of the package.

Using injection molding with thermoset materials, care must be taken to ensure the thermoset does not begin to interlace (or "cross link") prematurely, for example before exiting the nozzle (sprue) or before filling the cavities. Such instances can result in an cavity which is not completely filled, or a partially interlaced thermoset portion moving into the cavity, which can damage the bond wires. The invention reduces this possibility by separating the mold and the runner block from the encapsulation material storage area. Further, the sprue which injects the encapsulation material into the runner is separately heated, for example to a temperature of between about 70° C. and about 95° C., preferably to between about 80° C. and about 90° C. so that no appreciable interlacing of the molding material occurs in the nozzle. In the past it has been difficult to control the temperature of the molding material such that soon after a device is encapsulated the runner can be opened and the device ejected from the cavity to increase throughput. A temperature of between about 160° C. and about 200° C. for the low-pressure molding materials was found to reduce the typical time required to ensure a thermoset is sufficiently interlaced. This temperature is controlled with the instant invention by heating the runner block, preferably with a heating circuit different from the heating circuit of the nozzle to ensure controllability.

An optimum heating and cooling division between the mounting plate and the nozzle is achieved if the nozzle does not remain in contact with the mounting plate longer than necessary, for example if it remains in contact only during the actual injection process while the material is pressurized. For the remaining time the nozzle is not in contact with the mounting plate, and therefore the transfer of heat from the mounting plate to the cooler nozzle is reduced. The cooler nozzle can be insulated from the mounting plate, for example with a ceramic casing. Additionally, heat released while the encapsulation material interlaces is not transferred to the nozzle. Optionally, the nozzle or a portion of the nozzle can be manufactured with a material having a lower thermal conductivity than the runner block which can be manufactured from steel.

The mold, the runner block, the mounting plate, and the nozzle are preferably heated by a liquid which circulates through conduits in each unit. In the case of the runner block, the mounting plate, and the mold, the heat necessary for the rapid interlacing can be transported to each unit rapidly using liquid-filled conduits. The nozzle can be heated and also cooled by a circulating liquid and regulated to a sufficiently narrow temperature range to ensure that a thermoset material does not interlace in the nozzle. It is possible for the nozzle to be heated directly, however heating the nozzle using a circulating liquid is easily accomplished and may provide for a more rapid heating and cooling of the nozzle, and a more stable temperature.

If a thermoset material interlaces in the nozzle and clogs the nozzle, for example in an extended time which the equipment is not being used, a ramming tool or plunger is provided in the nozzle which can be advanced to the nozzle outlet to push the interlaced material from the nozzle.

In conventional systems, runners which deliver encapsulation material functioned solely as a supply for the encapsulation and were therefore large to deliver a large amount of encapsulation quickly, and thus the runners were designed without significant Theological control functions for achieving the optimum viscosity state during the filling procedure. An embodiment of the instant invention allows for controlling the temperature and thus the viscosity at locations previously uncontrolled using a gate system in conjunction with the injection of encapsulation.

Conventional large tools are constructed with cavity blocks which receive two lead frames at a time lying opposite each other along their longitudinal axes. The cavity blocks are injected via feeding conduits from a central injection cylinder. The cavities lying in a row on both sides of the feeding conduit are filled in series from a feeding conduit passing through the cavities. Depending of the flow path, the cavities are not filled uniformly as a result. The optimum use of the injection time for a uniform and simultaneous filling of all cavities can not be achieved with conventional technology. Therefore, compression molding materials with long processing times must be used and as a result the cycle times are lengthened and the system performance is diminished. With the inventive design, the individual cavities of a cavity block are injected individually via a runner kept in equilibrium through the use of an inventive runner block which makes it possible to optimize the filling process and to decrease cycle times.

Each runner path can be minimized in dimension to achieve a rapid warming of the compression molding material by means of an injection under high pressure. This rapidly achieves a low viscosity of the encapsulation material for the mold filling procedure. The smaller runners also serve to reduce the waste of encapsulation material, as each runner holds less material than prior equipment and thus less material remains in the runners.

The runners in the runner block through which conduits the encapsulation material flows into the cavities are preferably designed to be rectangular at a height of 1 millimeter (mm) and with a ratio of width to height of at least 3:1. Flat runners favor the transfer of heat from the runner block to the molding material and more quickly warm the encapsulation material to a temperature sufficient for its introduction into the cavities, for example between about 160° C. and about 200° C.

A further advantage of the device in accordance with the invention is that thermoplastic molding materials can also be process with it. In this instance the nozzle would be heated and the mold cooled. An IC manufacturer would therefore have the option of using thermoset or thermoplastic encapsulation.

BRIEF DESCRIPTION OF THE DRAWINGS

FIG. 4 is a plan view of a runner block and the runners therein.

FIG. 5 shows a cross section through V—V of the FIG. 4 runner block.

DETAILED DESCRIPTION OF THE INVENTION

Figure 1:
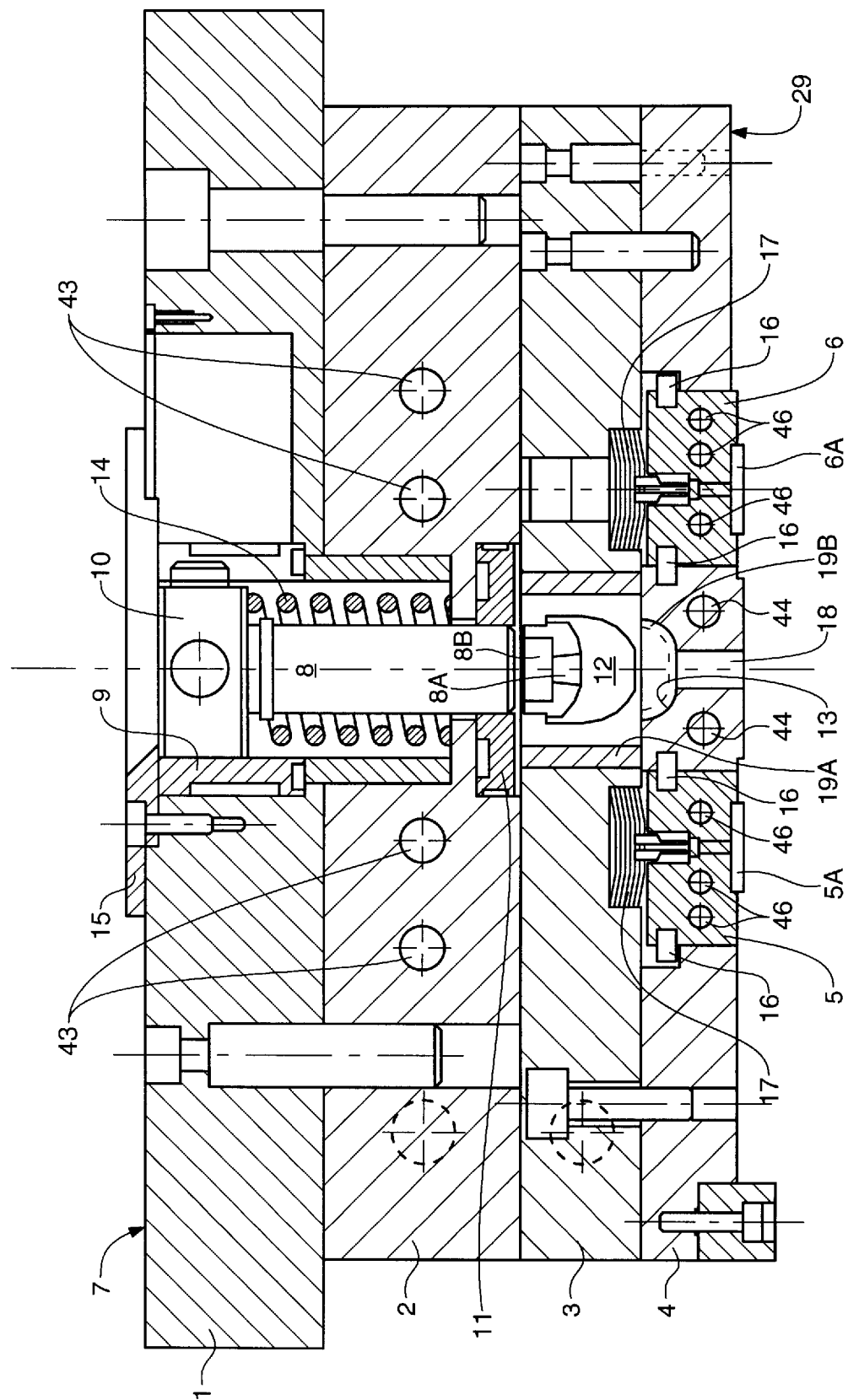
FIG. 1 is a longitudinal cross section of a first half of an injection tool for semiconductor die.

The tool half shown in FIG. 1 comprises base plate 1, temperature plate 2 clamped to the base plate, and mold carrier plate 3 which rests on the temperature plate and is detachably connected to it. Mounting plate 4 on mold carrier plate 3 comprises two detachable casting mold parts (cavity bars) 5, 6.

Base plate 1 is clamped by its backside 7 on an injection molding machine (not shown) having a screw cylinder (plasticizing screw or auger) which empties into nozzle or sprue 8 arranged in a central recess of base plate 1, temperature plate 2 and mold carrier plate 3. Guide sleeve 9 is provided in base plate 1 in which sleeve collar 10 on the rear end of the nozzle is guided in such a manner that it can shift longitudinally but not rotate. Guide ring 11 guides a front section of nozzle 8, and is fastened in the temperature plate. The nozzle has head 12 with a rounded (convex) front side which projects over guide ring 11 and is opposite a rounded (concave) recess 13 in mounting plate 4. A compression spring 14 is located between guide ring 11 and collar 10 which urges sleeve collar 10 against rear stop 15. Other means for urging said nozzle away from said mounting plate are possible.

Nozzle 8 comprises a channel (sprue hole) therethrough with narrow section 8a in the nozzle head 12 and a larger chamber 8b in the rear part of the nozzle. Nozzle head 12 can be manufactured from a titanium-aluminum alloy such as TiA16V4 with a coefficient of thermal conductivity of 6 watts/millikelvin (W/mK) and mounting plate 4 opposite the head can be manufactured from a chromium-nickel steel with a coefficient of thermal conductivity of 16 W/mK. The head, if manufactured from a material having a lower thermal conductivity than mounting plate 4, has increased resistance to receiving heat energy when in contact with mounting plate 4. Materials other than TiA16V4 for the nozzle head and cromium-nickel steel for the mounting plate may function sufficiently.

Figure 6:
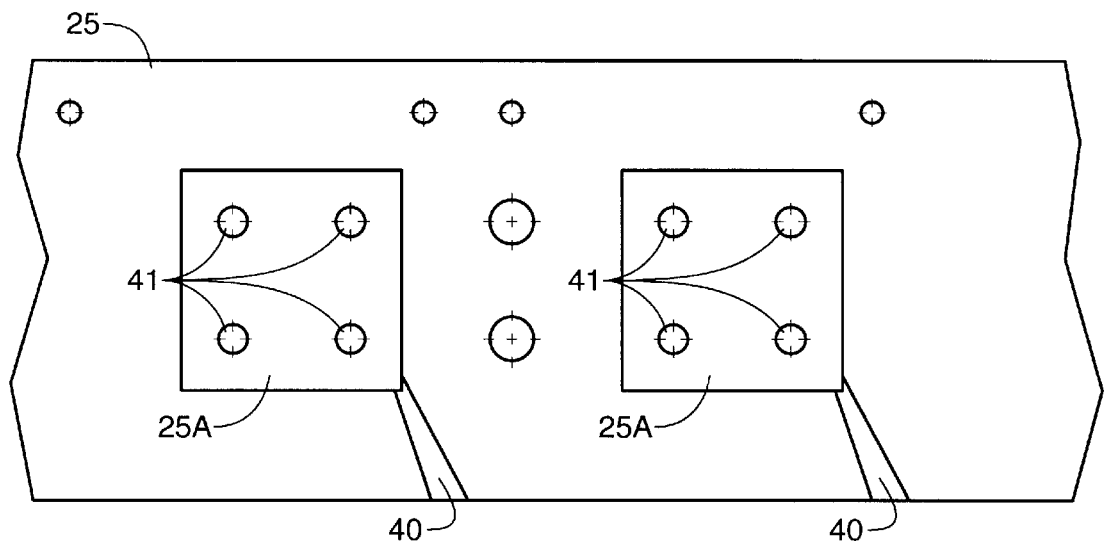
FIG. 6 shows a view of two cavities of a mold on an enlarged scale.

Mold parts 5, 6 such as cavity bars (see also FIG. 6) are held by lateral mounting strips 16 in an undercut of mounting plate 4, although other securing means are possible and likely. Cavity bars 5, 6 and are urged by cup springs 17 against the undercut. Cavity bars 5, 6 may not be flush with the front side of mounting plate 4 but may project slightly over the front side of mounting plate 4 when the mold is open. The cavity bars are therefore pressed by cup springs 17 against the corresponding cavity bars 25, 26 when the mold is closed.

Figure 2:
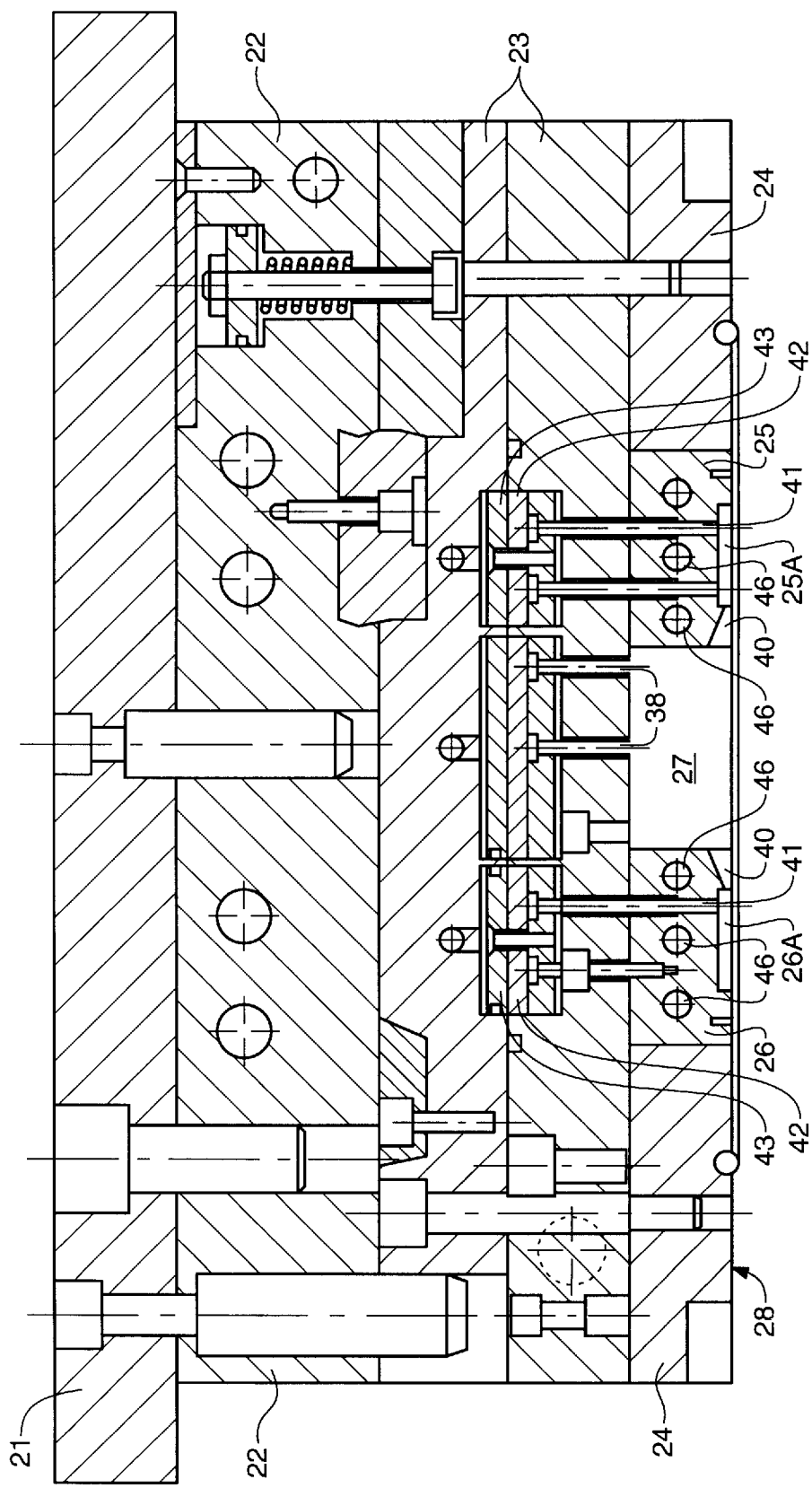
FIG. 2 shows in longitudinal cross section a second half of the injection tool which mates with the FIG. 1 structure.

The opposite (second) tool half shown in FIG. 2 comprises base plate 21, temperature plate 22 clamped to the base plate 21 by securing means 20, and multipartite mold carrier block 23 which is detachably fastened to temperature plate 22. Securing means 20 can comprise the arrangement as shown having a spring which allows some movement between the base plate 21 and the temperature plate 22. The carrier block 23 comprises cavity bars 25, 26 and runner block 27 which is received by mounting plate 24. The runner block and its associated runners are shown in detail in FIGS. 4 and 5.

The sealing line (the area between the two mold halves which mate) therefore comprises the area around the cavity bars 25, 26 as well as of runner block 27 on the front side 28 of mounting plate 24. To close the mold the two tool halves shown in FIGS. 1 and 2 are joined together by their front sides 28, 29 so that mold parts 5 and 6 mate with mold parts 25 and 26. Cavities 5a and 6a located in cavity bars 5 and 6 accordingly mate with cavities 25a and 26a in cavity bars 25 and 26.

Mounting plate 4 can have a flat surface while runner block 27 which mates with the mounting plate 4 comprises runners and other channels. The runner block shown in FIGS. 4 and 5 comprises collector space 30, which is opposite nozzle head 12, from which first and second channels 31, 32 emanate in opposite directions. Each channel 31, 32 leads to a stellate distributor 33 and 34 from each of which six runners 35 and 36 emanate. Alternately, each distributor may be associated with a separate nozzle, rather than the two distributors being associated with one nozzle as shown.

At least one bore 37 is located in each channel 31, 32 and runner 35, 36 as well as in collector space 30. Each bore extends at a right angle to the channel or runner and receives an ejector 38 actuated by pressure means. The ejectors urge from the runner any remaining solid encapsulation material after the encapsulation process.

FIG. 4 shows a lip 39 which seals the runner block to the mounting plate under normal pressures, but allows for excess encapsulation and gasses to flow past if excessive pressure is imparted between the runner block and the mounting plate which would force them apart. The channels and runners can have a rectangular cross section and can be relatively flat, and form channels when the runner block 27 and mounting plate 4 come together along surfaces 28 and 29. Channels 31 and 32, distributors 33 and 34, and runners 35 and 36 are covered by the level front side of the central section of opposite mounting plate 4 (FIG. 1). Hole 18 in mounting plate 4 emanates from concave recess 13 and empties centrally into collector space 30. Each runner 35, 36 is associated with one pair of cavities (5a, 25a and 6a, 26a). For simplification, only two pair of cavities are illustrated herein. Therefore, the encapsulation material flows from the sprue hole 8a into hole 18 in mounting plate 4, to collector space 30 of runner block 27, to one of channels 31, 32, to one of stellate distributors 33, 34, to one of runners 35, 36, to one of gates 40 (shown in detail in FIG. 7), to one of cavities 25a, 26a (see FIG. 6), across lead frame 48 and finally into one of cavities 5a, 6a.

Four ejector pins 41 actuated by pressure means urge the encapsulated device from cavities 25a, 26a after separation of the two halves shown in FIGS. 1 and 2. The four ejector pins 41 originate from a common base plate 42 which can be activated by short-stroke piston 50. Ejector pins 38 provided in the runner block are synchronized in a corresponding manner and urge the remaining material (cull) from the runners.

Numerous conduits which regulate the temperature of various tool elements run through the tool. As shown in FIG. 1, conduits 43 in temperature plate 2 heat or cool nozzle 8, for example to a temperature between about 80° C. and about 90° C. Also shown in FIG. 1, conduits 44 in mounting plate 4 cool or (more likely) heat the encapsulation material as it exits the sprue hole 8a. Similarly, conduits 45 in the runner block 27 (see FIG. 5) heat the runner block jointly with conduits 46 in the cavity bars 5, 6, 25, 26. Further conduits 47 (FIG. 2) heat temperature plate 22.

A liquid circulates in all conduits 43 to 47. For example, water can be used in conduits 43 and oil can be used in the remaining conduits, although other liquids may function sufficiently depending on the boiling point of the liquid and desired temperature of each element. The temperature of each liquid circulating in conduits 43 to 47 is preferably regulated separately to allow for adjusting the temperature of each tool element in an optimal manner to ensure interlacing of thermoset at the proper locations or the softening and hardening of thermoplastic in an efficient manner. Also, it is preferable that runners 35, 36 in FIG. 4 have approximately equal lengths, and channels 31 and 32 have equal lengths, so the temperature and the flow of encapsulation material can be more precisely controlled. Further, the length of each runner should be at least ten times its width and, preferably, between about 50 and 500 times its width to ensure the encapsulation material reaches its interlacing temperature, although other ratios of length to width, either greater or smaller, may be possible.

Figure 3:
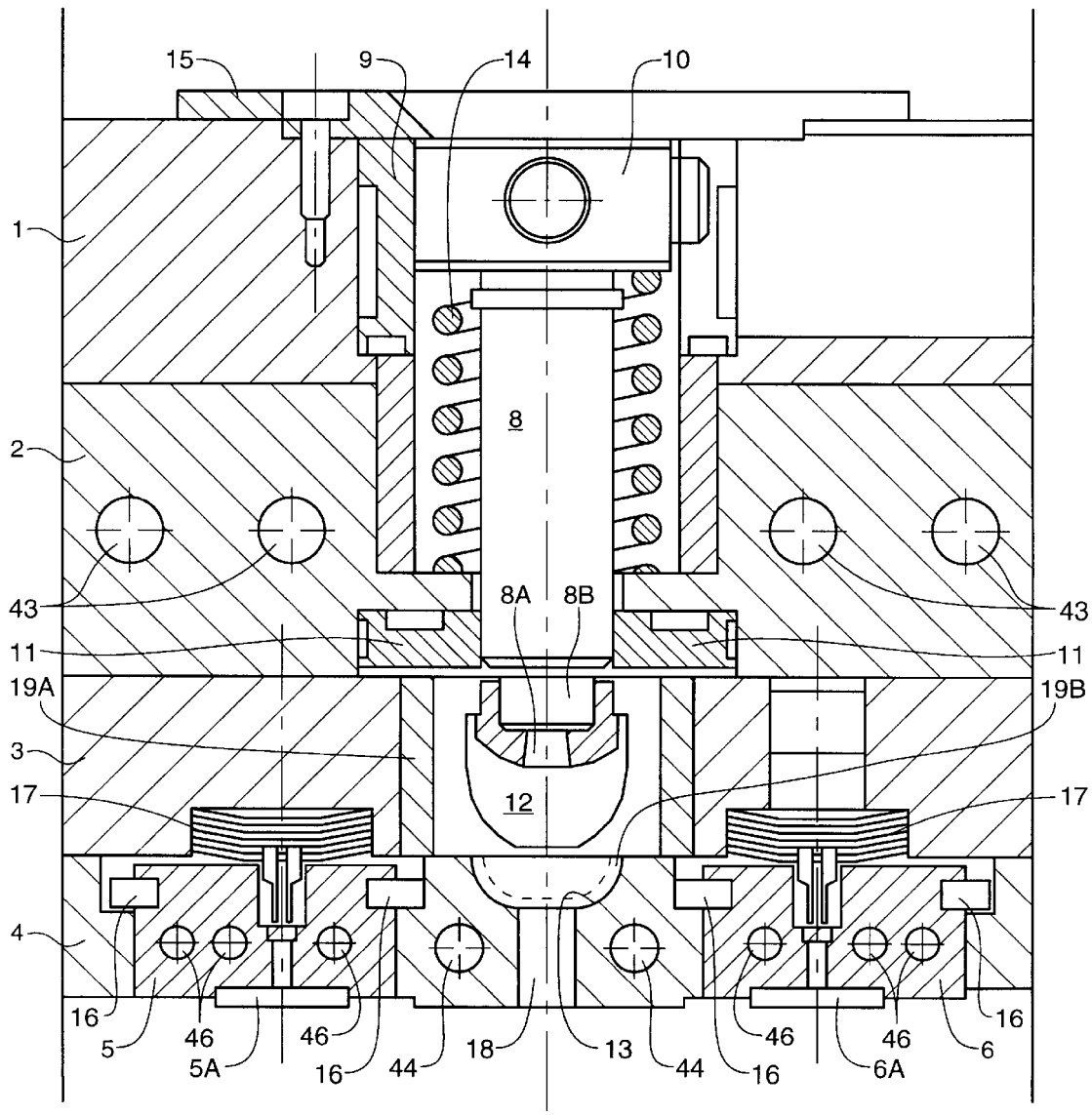
FIG. 3 is a cross section showing an enlargement of a nozzle and surrounding area from the FIG. 1 structure.
Figure 7:
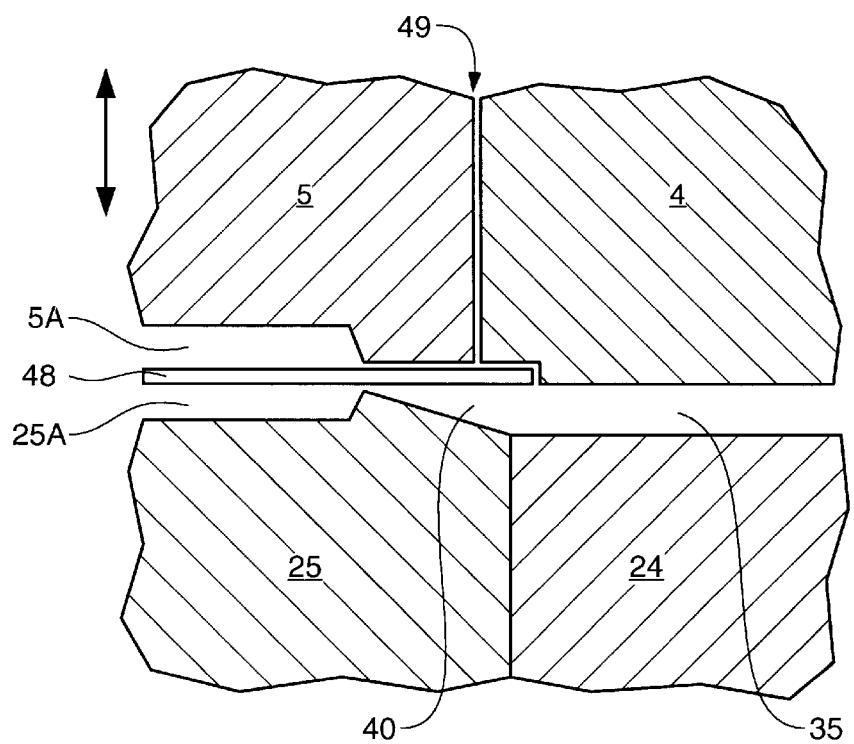
FIG. 7 is a cross section showing a lead frame between a pair of cavity bars, a mounting plate, and a runner block.

Integrated circuits to be encapsulated are attached to the lead frame. As shown in FIG. 7, the runner block 27 and mounting plate 4 come together with the lead frame 48 and die (not shown) therebetween such that each die is located in a cavity formed by 5a and 25a or 6a and 26a. Seam 49 separates cavity bar 5 from the adjacent mounting plate 4 as shown, and a similar seam exists for cavity bar 6. After the insertion of the lead frame 48 the mold is closed and nozzle 8 is pressed against the force of spring 14 (FIG. 3 shows an enlarged view of the nozzle 8, the spring 14, and the surrounding area). The head 12 of nozzle 8 mates with the opposing recess 13 and the injection procedure is started. The plasticizing screw (not shown) arranged behind nozzle 8 presses the molding material through the sprue hole 8a of nozzle 8. The molding material exits out of the sprue hole with a temperature of about 80° C. to about 90° C., or other temperatures depending on the encapsulation material. The material passes into hole 18 in mounting plate 4, then into various spaces in runner block 27 and is heated on the way into the various cavities in the cavity bars. The flat cross section of the runners aids in efficiently heating the encapsulation material to a temperature of between about 160° C. and about 200° C. At this temperature the molding material flows easily and begins to cross link. After a few seconds the molding material is cross linked to such an extent that the mold can be opened. The encapsulated die and lead frames are then ejected by ejector pins 41, and the encapsulation remaining in the runners is ejected by ejector pins and 38.

Immediately after the end of the injection process the head 12 of nozzle 8 is withdrawn by spring 14 from recess 13 so that no more heat can be conducted onto head 12 from the hot central part of mounting plate 4. In addition, in order to hinder the transfer of heat onto the nozzle, head 12 can be protected with ceramic 19A which surrounds the head and screens it, or the head can be coated with ceramic 19B.

If encapsulation material which is too completely interlaced should exit from the nozzle at the start of a shot (a "cull") it is captured in opposing collector space 30. Following the shot and the opening of the tool the cull is ejected.

Figure 8:
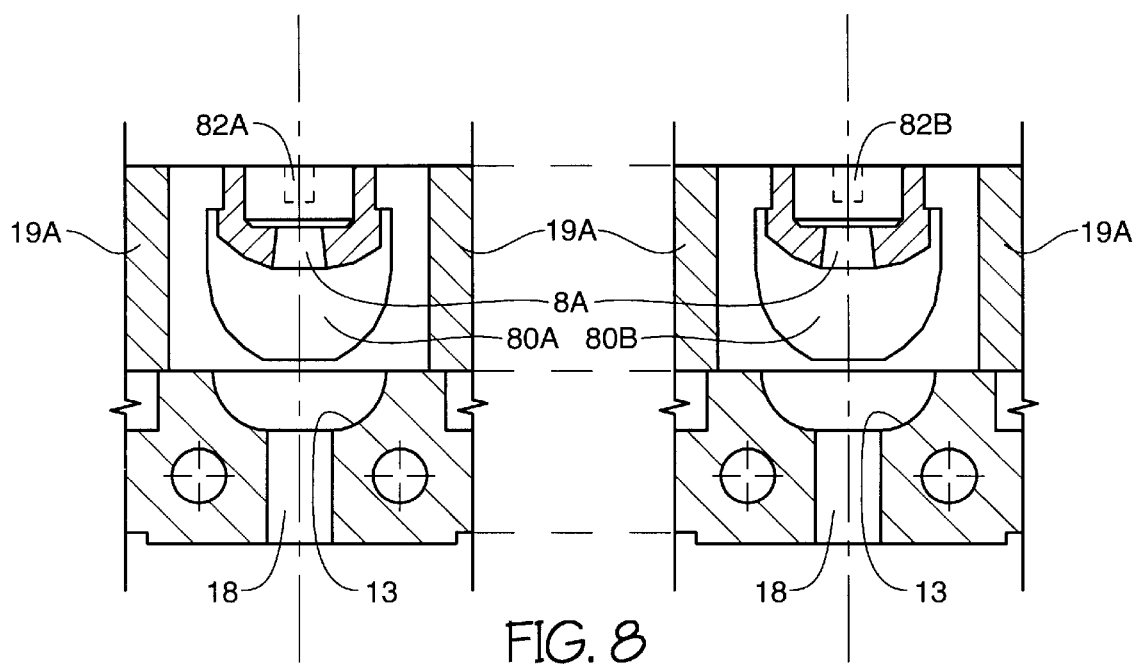
FIG. 8 is a cross section showing an embodiment having two nozzles and ramming tools or plungers.

FIG. 8 is a cross section showing an embodiment having first 80A and second 80B nozzles. The first nozzle 80A injects encapsulation into a first distributor (not shown) and the second nozzle 80B injects encapsulation into a second distributor (not shown) as previously described. FIG. 8 further shows first 82A and second 82B ramming tools or plungers each received by one of nozzles 80A, 80B respectively. If a thermoset material interlaces in the nozzle and clogs the nozzle, for example during an extended time which the equipment is not being used, the ramming tool or plunger provided in the nozzle is advanced to the nozzle outlet to push the interlaced material from the nozzle.

What is claimed is:

1. An injection molding device for encapsulating a plurality of semiconductor die, comprising:
    a form having first and second halves such that as said first half contacts said second half said first and second halves form a plurality of cavities therein, said first and second halves forming a conduit therein for receiving a heated liquid;
    a runner block having a separate runner therein for each said cavity, said runner block further having a conduit therein for receiving a heated liquid, wherein each said runner has a rectangular cross section and a width to height ratio of at least 3:1, a height of one mm or less, and a length and width wherein said length is at least ten times said width;
    a mounting plate which mates with said runner block, said mounting plate having a concave recess therein and a hole at said concave recess;
    a heated nozzle having a hole therethrough and a convex head wherein said concave recess is adapted to receive said convex head wherein said convex portion of said nozzle has a thermal conductivity less than a thermal conductivity of said mounting plate;
    a temperature plate which receives said nozzle and comprises conduits which receive a liquid for heating said temperature plate, said temperature plate heating said nozzle thereby;
    wherein said hole in said mounting plate aligns with said hole in said nozzle such that an encapsulation material can pass between said nozzle and said hole in said mounting plate;
    a spring for urging said nozzle away from said mounting plate; and
    a ramming tool or plunger adapted to remove interlaced material from said hole in said nozzle.

2. The device of claim 1 wherein said length of each said runner is between about 50 and about 500 times said width of each said runner.

3. The device according to claim 2 wherein said runner block has at least first and second stellate distributors therein and at least six runners emanate from each said stellate distributor.

4. The device of claim 3 further comprising first and second nozzles, wherein said first nozzle injects encapsulation into said first distributor and said second nozzle injects encapsulation into said second distributor.

5. The device of claim 1 further comprising thermoset encapsulation in each said runner.

6. The device of claim 1 further comprising thermoplastic encapsulation in each said runner.

7. The device of claim 1 wherein said form is a cavity bar and said injection molding device further comprises a lead frame having a plurality of semiconductor dies attached thereto wherein each said cavity of said cavity bar receives one of said dies.

8. An injection molding device for encapsulating a plurality of semiconductor die, comprising:

a form having first and second halves such that as said first half contacts said second half said first and second halves form a plurality of cavities therein, said first and second halves each comprising a conduit therein for receiving a heated liquid;

a runner block having a separate runner therein for each said cavity, each said runner having a rectangular cross section and a width to height ratio of at least 3:1, said runner block further having a conduit therein for receiving a heated liquid and a hole therein;

a mounting plate for mating with said runner block, said mounting plate comprising a concave recess and a hole therein at said recess which passes through said mounting plate to align with said hole in said runner block such that an encapsulation material can pass between said mounting plate and said runner block;

a heated nozzle having a hole therethrough and a convex ceramic-coated head wherein said concave recess is adapted to receive said convex head such that an encapsulation material can pass between said nozzle and said mounting plate;

a ramming tool or plunger adapted to remove interlaced material from said hole in said nozzle; and a spring for urging said nozzle away from said mounting plate.

9. The device of claim 8 further comprising thermoset encapsulation in each said runner.

10. The device of claim 8 further comprising thermoplastic encapsulation in each said runner.

11. The device of claim 8 wherein said form is a cavity bar and said injection molding device further comprises a lead frame having a plurality of semiconductor dies attached thereto wherein each said cavity of said cavity bar receives one of said dies.

* * * * *